United States Patent [19]

Yorozu

[11] Patent Number: 5,541,487
[45] Date of Patent: Jul. 30, 1996

[54] DRIVING CIRCUIT FOR STEPPING MOTOR

[75] Inventor: Hideki Yorozu, Takizawa-mura, Japan

[73] Assignees: Alps Electric Co., Ltd., Tokyo;
Sanken Electric Co., Ltd., Saitama, both of Japan

[21] Appl. No.: 378,026

[22] Filed: Jan. 24, 1995

[30] Foreign Application Priority Data

Jan. 24, 1994 [JP] Japan .................................. 6-023387

[51] Int. Cl.⁶ ........................................... H02K 29/00
[52] U.S. Cl. ......................... 318/685; 318/254; 318/138; 318/797
[58] Field of Search ...................... 318/138, 245, 318/254, 560–696, 797; 388/800–890

[56] References Cited

U.S. PATENT DOCUMENTS

| | | | |
|---|---|---|---|
| 4,005,347 | 1/1977 | Erdman | 318/254 |
| 4,117,364 | 9/1978 | Baker | 318/230 |
| 4,169,990 | 10/1979 | Lerdman | 318/138 |
| 4,916,379 | 4/1990 | Wand et al. | 318/599 |
| 5,146,147 | 9/1992 | Wills et al. | 318/797 |
| 5,214,365 | 5/1993 | Bahn | 318/701 |
| 5,289,099 | 2/1994 | Bahn | 318/739 |
| 5,319,297 | 6/1994 | Bahn | 318/701 |
| 5,377,094 | 12/1994 | Williams et al. | 318/434 |

*Primary Examiner*—Paul Ip
*Attorney, Agent, or Firm*—Guy W. Shoup; Patrick T. Bever

[57] ABSTRACT

A driving circuit for a stepping motor comprises bridge circuits being composed of switching elements connected between a DC power source and the coils of a stepping motor, rectifier diodes connected in antiparallel to the switching elements, capacitors connected in parallel to the bridge circuits, and constant voltage diodes connected between the DC power source and junction points of the bridge circuits and the capacitors. The switching elements are constituted to be ON/OFF controlled by a predetermined exciting system, and the constant voltage diodes are set to turn conductive to form a feedback circuit even if they are in a biased state in the reverse direction when the capacitors are charged up to a voltage which is higher than the source voltage and lower than the breakdown voltage of the switching elements by the counter electromotive force induced in the coils.

6 Claims, 10 Drawing Sheets

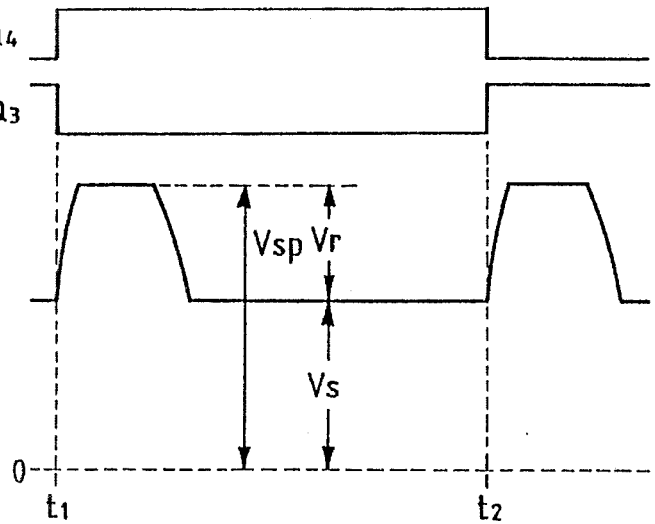
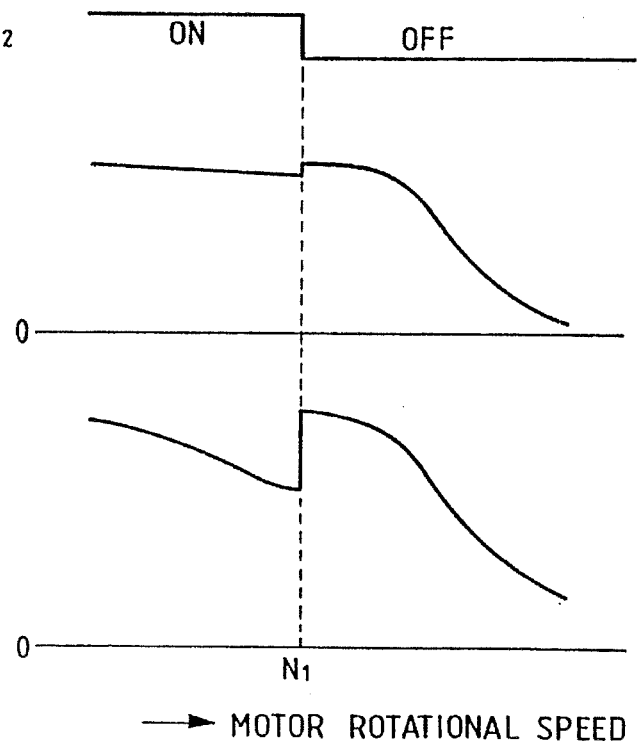

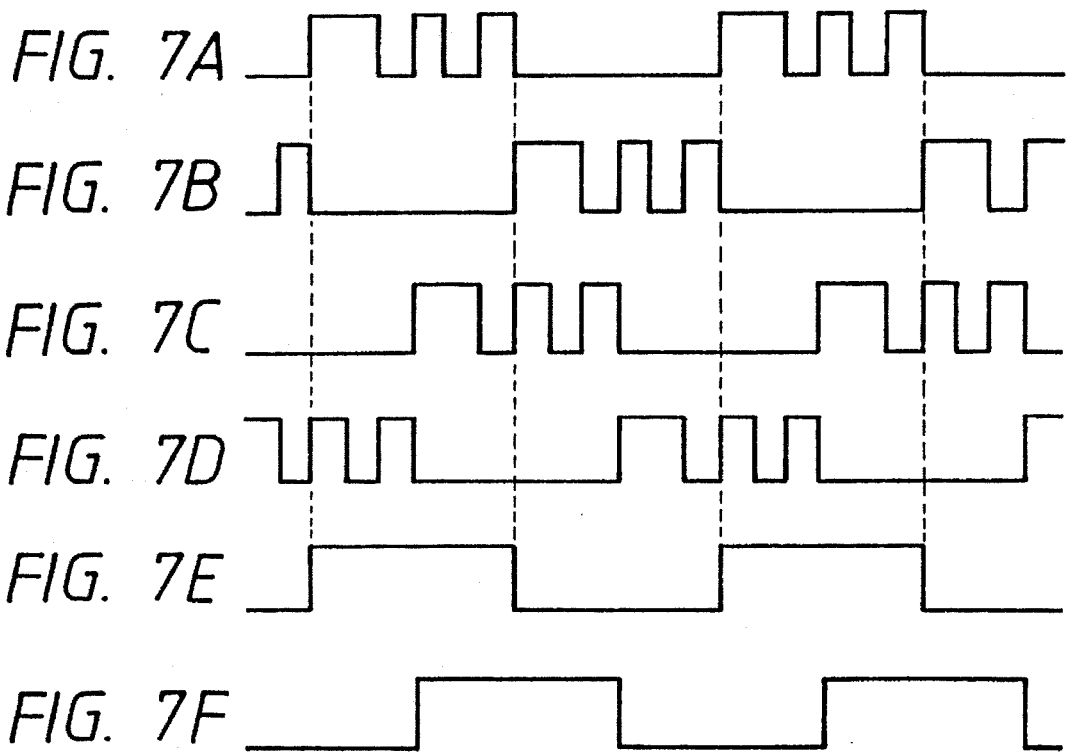
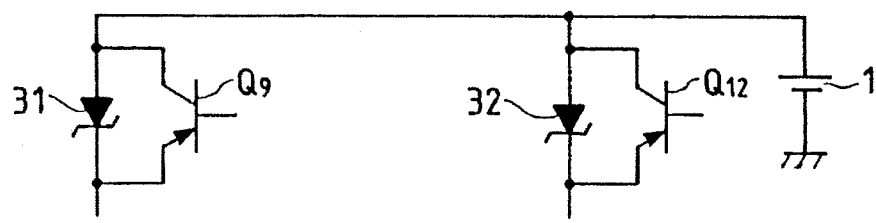

FIG. 10
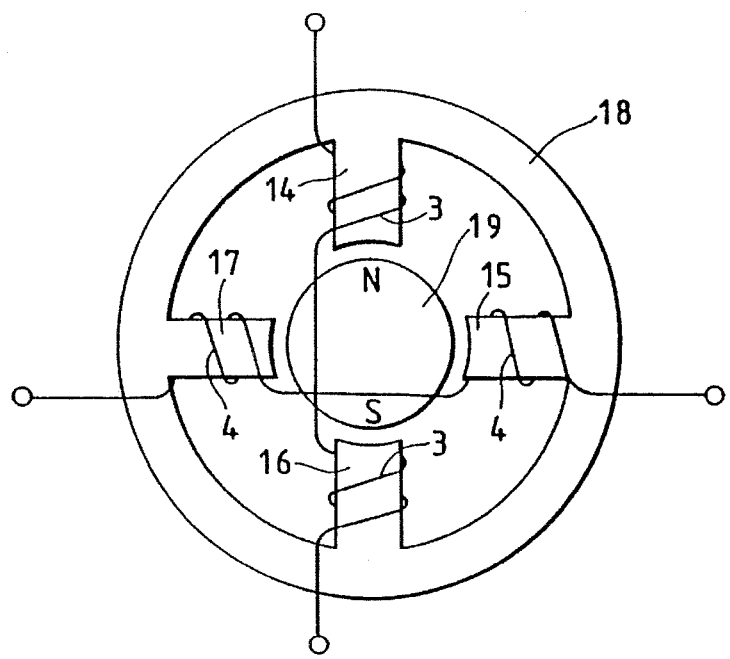
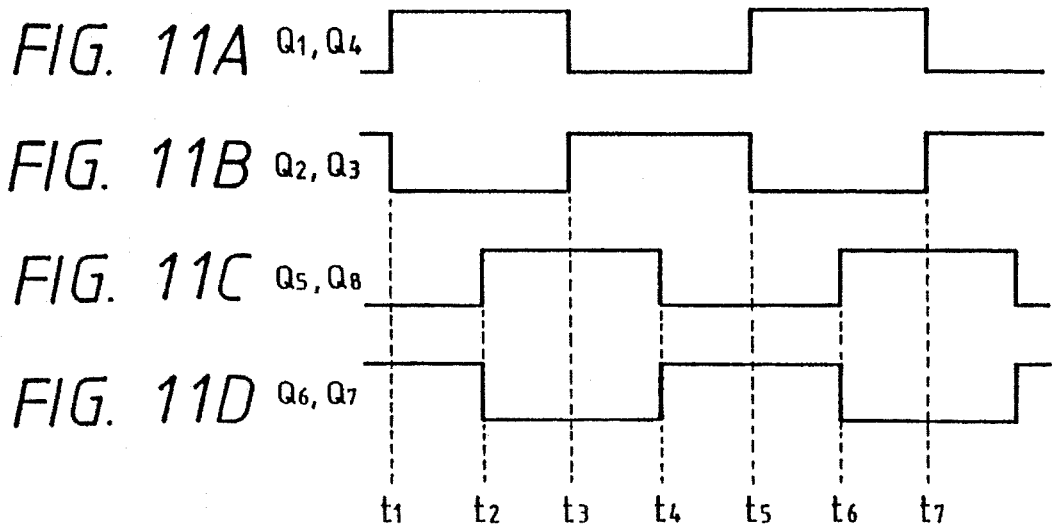
FIG. 11A  Q1, Q4
FIG. 11B  Q2, Q3
FIG. 11C  Q5, Q8
FIG. 11D  Q6, Q7

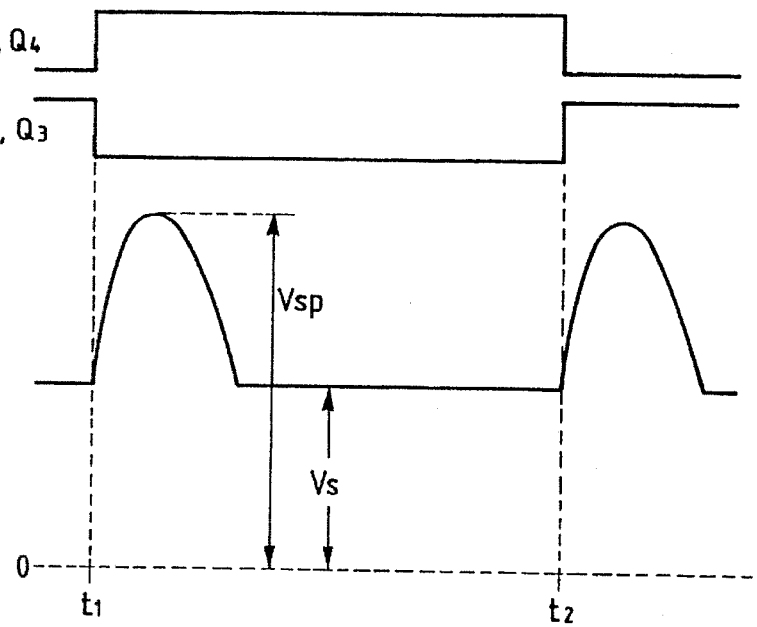
FIG. 13A Q1,Q4 PRIOR ART
FIG. 13B Q2,Q3 PRIOR ART
FIG. 13C Vc PRIOR ART

DRIVING CIRCUIT FOR STEPPING MOTOR

BACKGROUND OF THE INVENTION (1) Field of the Invention

The present invention relates to a driving circuit for a stepping motor being constituted to perform bipolar driving.

(2) Description of the Related Art

A driving circuit of a bipolar system has been used as a driving circuit for a stepping motor.

A driving circuit of a bipolar system is shown in FIG. 9. As shown in the figure the driving circuit is constituted with a first and a second bridge circuits, 5 and 6, connected between a DC power source 1 and coils, 3 and 4, of a stepping motor 2. The first bridge circuit 5 is formed with a first, a second, a third and a fourth switching elements, Q1, Q2, Q3 and Q4, being composed of transistors, and the second bridge circuit 6 is formed with a fifth, a sixth, a seventh and an eighth switching elements, Q5, Q6, Q7 and Q8 being composed of transistors. In order to feedback the counter electromotive force (accumulated energy) induced in the coils, 3 and 4, to the power source, a first to an eighth diodes, D1 to D8 are connected in antiparallel to the first to the eighth switching elements, Q1 to Q8, respectively.

An end of the first coil 3 is connected to the middle point between the first and the second switching elements, Q1 and Q2, and the other end of the first coil 3 is connected to the middle point between the third and the fourth switching elements, Q3 and Q4. An end of the second coil 4 is connected to the middle point between the fifth and the sixth switching elements, Q5 and Q6, and the other end of the second coil 4 is connected to the middle point between the seventh and the eighth switching elements, Q7 and Q8.

An end of the DC power source 1 is connected to the junction point 7 (a terminal on the power source side) of the first and the third switching elements, Q1 and Q3, of the first bridge circuit 5, and to the junction point 8 (a terminal on the power source side) of the fifth and the seventh switching elements, Q5 and Q7, of the second bridge circuit 6, and the other end of the DC power source 1 is connected to the junction (ground) of the second and the fourth switching elements, Q2 and Q4, of the first bridge circuit 5, and to the junction point (ground) of the sixth and the eighth switching elements, Q6 and Q8, of the second bridge circuit 6.

An exciting signal generator 9 is a well-known circuit which transmits exciting signals shown in FIGS. 11(A), 11(B), 11(C) and 11(D), to lines, 10, 11, 12 and 13, to drive a stepping motor 2 with a predetermined exciting system (for example, a bipolar exciting system). The exciting signal line 10 is connected to the control terminals (bases) of the first and the fourth switching elements, Q1 and Q4, the exciting signal line 11 is connected to the control terminals of the second and the third switching elements, Q2 and Q3, the exciting line 12 is connected to the control terminals of the fifth and the eighth switching elements, Q5 and Q8, and the exciting signal line 13 is connected to the control terminals of the sixth and the seventh switching elements, Q6 and Q7. A resistor is connected to each of the base lines of switching elements, Q1 to Q8.

The principle of the constitution of the stepping motor 2 is as shown in FIG. 10; for example, it comprises a stator core 18 having a first, a second, a third and a fourth magnetic poles, 14, 15, 16 and 17 being disposed at intervals of 90 degrees and a rotor 19 being composed of a permanent magnet having an N pole and an S pole at intervals of 180 degrees. The first coil 3 is wound on the first and the third magnetic poles, 14 and 16, and the second coil 4 is wound on the second and the fourth magnetic poles, 15 and 17.

When the stepping motor 2 is driven by a bipolar two-phase exciting system, the first to the eighth switching elements, Q1 to Q8, are ON/OFF controlled by the exciting signal shown in FIGS. 11(A), 11(B), 11(C) and 11(D). In the period of time, t1 to t3, shown in FIG. 11(A), the first and the fourth switching elements, Q1 and Q4, are made ON simultaneously. Thereby, a current in a first direction is made to flow through the first coil 3 in a circuit constituted with the DC power source 1, the first switching element Q1, the first coil 3 and the fourth switching element Q4.

In the period of time, t3 to t5, shown in FIG. 11(B), the second and the third switching elements, Q2 and Q3, are made ON, and a current in a second direction is made to flow through the first coil 3 in a circuit constituted with the DC power source 1, the third switching element Q3, the first coil 3 and the second switching element Q2.

In the period of time, t2 to t4, shown in FIG. 11(C), the fifth and the eighth switching elements, Q5 and Q8, are made ON, and a current in the first direction is made to flow through the second coil 4 in a circuit constituted with the DC power source 1, the fifth switching element Q5, the second coil 4 and the eighth switching element Q6.

In the period of time, t4 to t6, shown in FIG. 11(D), the sixth and the seventh switching elements, Q6 and Q7, are made ON, and a current in the second direction is made to flow in the second coil 4 in a circuit constituted with the DC power source 1, the seventh switching element Q7, the second coil 4 and the sixth switching element Q6.

When any one of the switching elements, Q1 to Q8, is changed from ON to OFF, a counter electromotive force is induced in the first coil 3 or the second coil 4. When the second and the third switching elements, Q2 and Q3, are changed from ON to OFF, and the first and the fourth switching elements, Q1 and Q4, are changed from OFF to ON, based on the counter electromotive force induced in the first coil 3, a current is made to flow in a circuit constituted with the first coil 3, the first diode D1, the DC power source 1 and the fourth diode D4, and the accumulated energy in the first coil 3 is fed back to the DC power source 1. At this time, since the first and the fourth diodes, D1 and D4, are made ON, the application of a high voltage based on the counter electromotive force to the first and the fourth switching elements, Q1 and Q4, is prevented; thus the first and the fourth switching elements, Q1 and Q4, can be protected.

When the switching elements, Q1, and Q4 to Q8, other than the above-mentioned second and the third switching elements, Q2 and Q3, are changed from ON to OFF, a similar action to the above is performed.

When a current based on the counter electromotive force is flowing through the first and the fourth diodes, D1 and D4, for example, even if exciting signals are given to the first and the fourth switching elements Q1 and Q4, these switching elements, Q1 and Q4, are not made ON. Therefore, when the period of time in which a current based on the counter electromotive force flows (feedback current period) is long, since an actual exciting period is disposed after the feedback current period, it becomes necessary to lengthen the period of the exciting signal; thereby, there occurs a problem that the stepping motor 2 cannot be operated at a high rotational speed.

A method described in the following is well-known to the public as a method for solving the problem: in the method, in order to make the feedback current period short and to increase the pullout torque of the stepping motor 2, as shown in FIG. 12, a first and a second capacitors, 20 and 21, are connected in parallel to respective bridge circuits, 5 and 6.

In FIG. 12, the first capacitor 20 is connected between the junction point 7 of the first bridge circuit 5 and the ground, and a diode 22 for preventing feedback is connected between the junction point 7 and the DC power source 1. The second capacitor 21 is connected between the junction point 8 of the second bridge circuit 6 and the ground, and a diode 23 for preventing feedback is connected between the junction point 8 and the DC power source 1. Except the above-mentioned points, the circuit is constituted in the same manner as that shown in FIG. 9.

In the circuit shown in FIG. 12, owing to the capacitors, 20 and 21, for example, as shown in FIGS. 13(A) and 13(B), at the time of t1, the exciting signal is given to the first and the fourth switching elements, Q1 and Q4, and when the second and the third switching elements, Q2 and Q3, are made OFF, a current based on the counter electromotive force induced in the first coil 3 is made to flow through a circuit constituted with the first coil 3, the first diode D1, the first capacitor 20 and the fourth diode D4. Thereby, the accumulated energy in the first coil 3 is absorbed by the capacitor 20. The period of time in which a current flows based on the counter electromotive force can be adjusted by the capacity of the capacitor 20, so that it is made possible to operate the stepping motor 2 at a high rotational speed by making the feedback period shorter than that in the circuit described in FIG. 9. The energy accumulated in the capacitor 20 functions as a power source to make a current flow in the first direction in the first coil 3 when the first and the fourth switching elements, Q1 and Q4, are made ON; therefore, it is made possible to increase the pullout torque of the stepping motor 2.

In the circuit shown in FIG. 12, however, when the charged voltage of the capacitors, 20 and 21, is made higher than the breakdown voltage of the switching elements, Q1 to Q8, by the dispersion of circuit constants such as the first and the second coils, 3 and 4, or the capacitors, 20 and 21, the breakdown of the switching elements may occur in the OFF period and in some case they may be destroyed. In FIG. 13(C), the charged voltage Vc of the capacitor 20 is shown, and at a time t1, when the switching elements, Q2 and Q3, are turned OFF (change from ON to OFF), it is charged up to a voltage Vsp which is higher than the source voltage Vs, and if the Vsp becomes higher than the resisting voltage of the second switching element Q2 or of the third switching element Q3, there used to be a fear that the breakdown of a switching element can occur.

SUMMARY OF THE INVENTION

The present invention was invented in consideration of the above-mentioned problem, and an object of the present invention is to offer a driving circuit for a stepping motor in which high rotational speed operation of the stepping motor is made possible and also the breakdown of the switching elements can be prevented by the function of the capacitors.

Another object of the present invention is to offer a driving circuit for a stepping motor with which both low rotational speed operation and high rotational speed operation can be performed properly.

A further object of the present invention is to offer a driving circuit for a stepping motor having the constitution in which the switching elements can be ON/OFF controlled by a predetermined exciting system and comprising: bridge circuits being composed of switching elements connected between a DC power source and the coils of a stepping motor; rectifier diodes connected antiparallel to the switching elements; capacitors connected in parallel to the bridge circuits; constant voltage diodes connected between the DC power source and the bridge circuits having a directivity of being able to make a current flow through the bridge circuits from the DC power source when the diodes are biased in the forward direction, and when the capacitors are charged up to a predetermined voltage which is lower than the breakdown voltage of the switching elements by the counter electromotive force induced in the coils, the diodes are set to turn conductive even when they are biased in the reverse direction.

Yet another object of the present invention is to offer a driving circuit for a stepping motor having the constitution in which the switching elements can be ON/OFF controlled by a predetermined exciting system and comprising: bridge circuits composed of switching elements connected between a DC power source and the coils of a stepping motor; rectifier diodes connected in antiparallel to the switching elements; capacitors connected in parallel to the bridge circuits; rectifier diodes connected between the DC power source and the junction points of the bridge circuits and the capacitors and having directivity to be able to make currents flow in the circuits through the bridge circuits from the DC power source; switching elements for feedback having directivity to be able to make currents flow based on the counter electromotive force induced in the coils being connected in parallel to the rectifier diodes; and control circuits which ON/OFF control the switching elements for feedback.

A still further object of the present invention is to offer a driving circuit for a stepping motor having the constitution in which the switching elements can be ON/OFF controlled by a predetermined exciting system and comprising: bridge circuits being composed of switching elements connected between the DC power source and the coils of a stepping motor; rectifier diodes connected in antiparallel to the switching elements; capacitors connected in parallel to the bridge circuits; constant voltage diodes which are connected between the DC power source and the junction points of the bridge circuits and the capacitors and turn conductive even when they are biased in the reverse direction when the capacitors are charged up to a predetermined voltage which is higher than the voltage of the DC power source and lower than the breakdown voltage of the switching elements by the counter electromotive force induced in the coils; switching elements for feedback connected in parallel to the constant voltage diodes; and control circuits which ON/OFF control the switching elements for feedback.

In the case of a driving circuit for a stepping motor according to the present invention as described in the above, a constant voltage diode is made to be in an ON state at a reverse voltage lower than the resisting voltage of switching elements, and the charged voltage of capacitors is limited to the sum of the voltage of the DC power source and the voltage of the constant voltage diode (a constant value); thereby, the breakdown of switching elements can be prevented.

In the case of a driving circuit for a stepping motor according to the present invention, the stepping motor can be driven at a low rotational speed or at a high rotational speed.

Further, in the case of a driving circuit for a stepping motor according to the present invention, the generation of a high voltage which may occur in a high rotational speed region can be prevented; thereby, the destruction of switching elements caused by the breakdown can be prevented.

BRIEF DESCRIPTION OF THE DRAWINGS

FIG. 2 is a waveform chart showing an exciting signal to be transmitted to a first bridge circuit and a charged voltage of a capacitor in the circuit diagram shown in FIG. 1;

FIG. 4 shows the relation between the motor rotational speed and the ON/OFF of transistors, Q9 and Q12, the characteristics between the motor rotational speed and the pullout torque, and the characteristics between the motor rotational speed and the supply current from the DC power source in the circuit shown in FIG. 3;

FIG. 7 is a waveform chart showing the states at A to F points in the circuit shown in FIG. 6;

FIG. 8 is a circuit diagram showing a part of a circuit in which the diodes shown in FIG. 3 are replaced with constant voltage diodes;

FIG. 10 is a block diagram showing the principle of a stepping motor;

FIG. 11 is a waveform chart showing the states of an exciting signal at A to D points in the circuits shown in FIGS. 1, 3, 5, 9 and 12;

FIG. 13 is a waveform chart of the exciting signal to be transmitted to the first bridge circuit and the charged voltage of a capacitor in the circuit shown in FIG. 12.

DETAILED DESCRIPTION OF THE PREFERRED EMBODIMENTS

Figure 1:
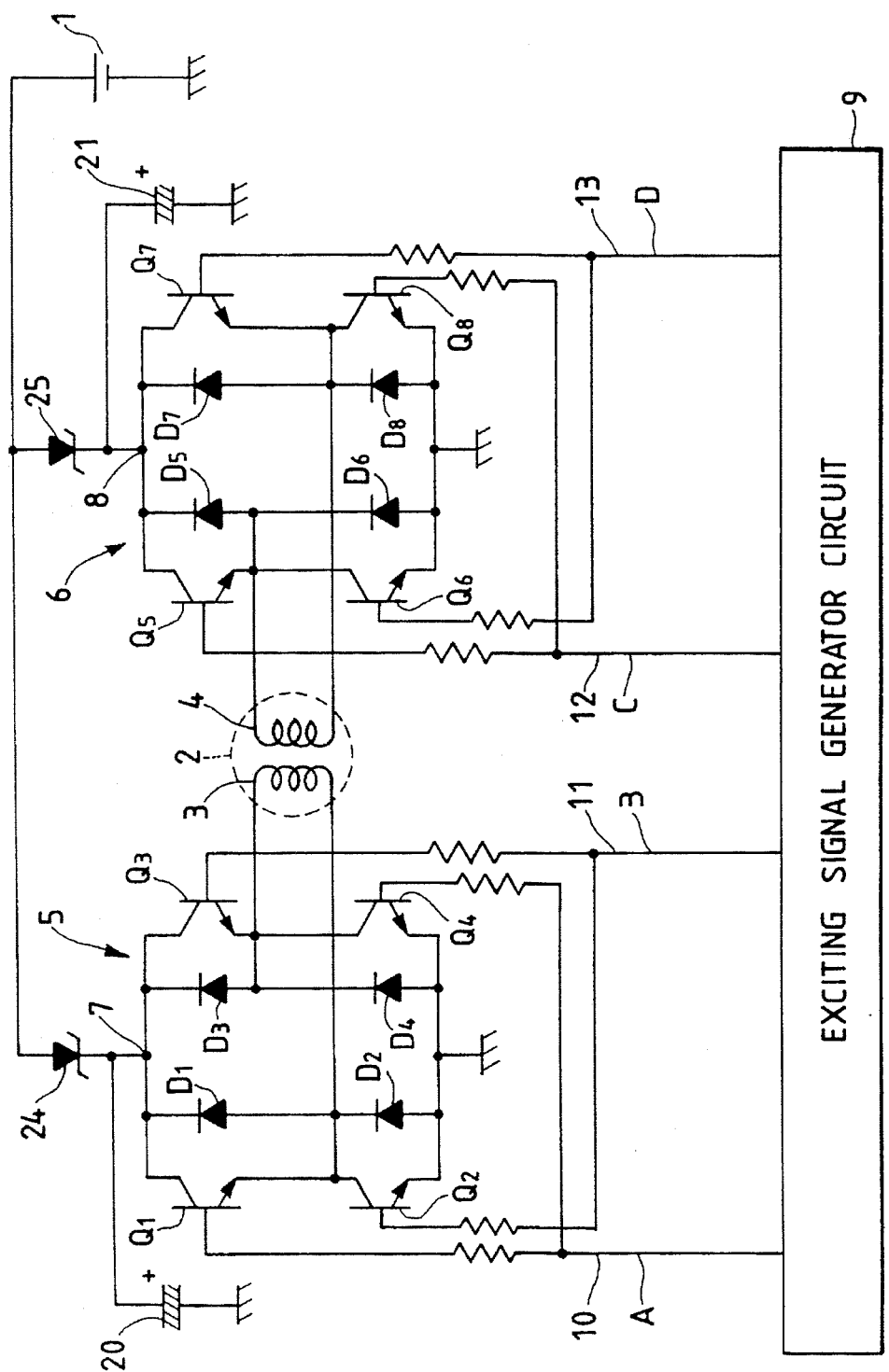
FIG. 1 is a circuit diagram showing a driving circuit for a stepping motor in a first embodiment according to the present invention.

The embodiments according to the present invention will be explained in the following referring to the drawings.
(Embodiment 1)

Figure 9:
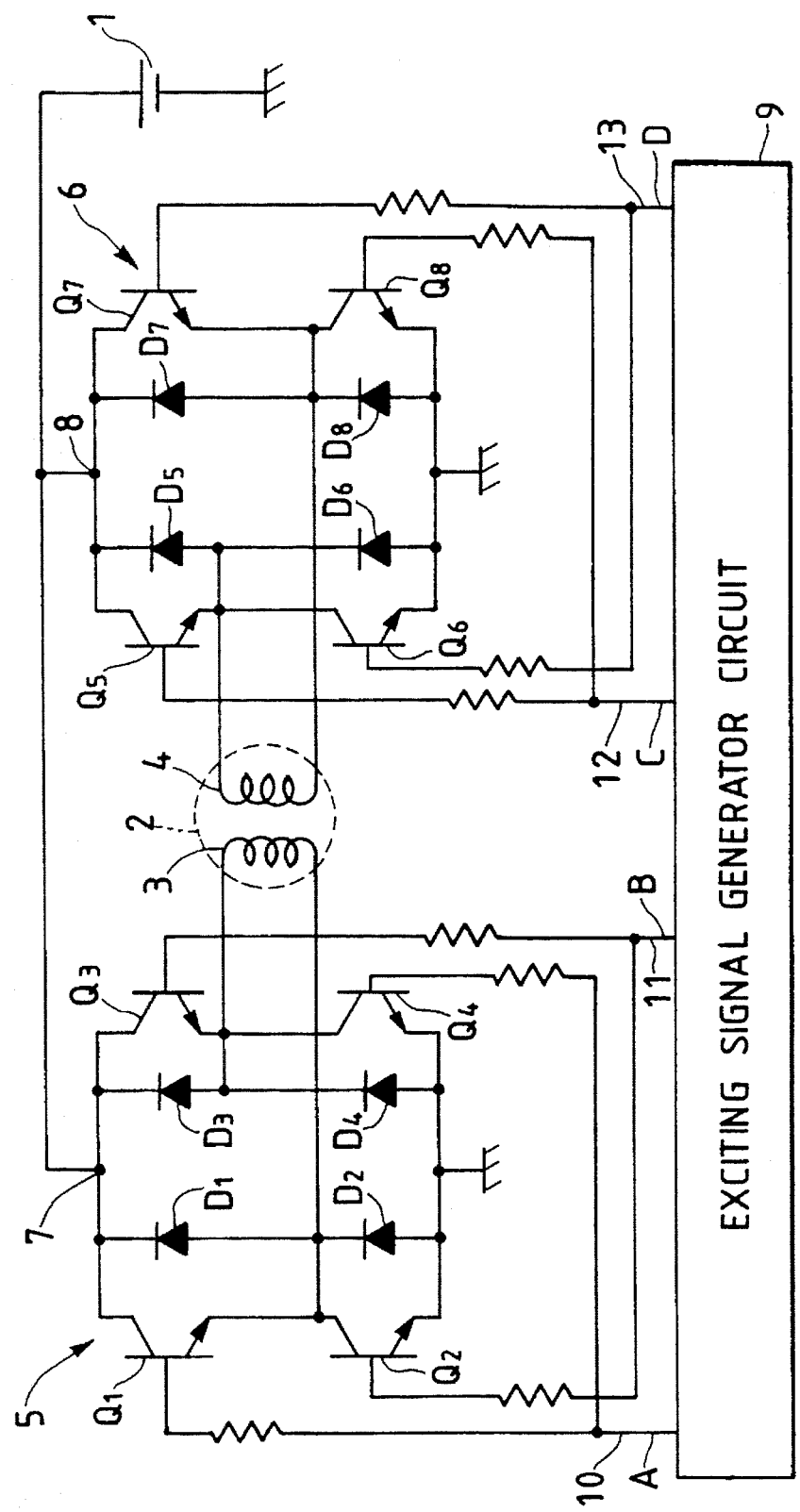
FIG. 9 is a circuit diagram showing an example of a conventional driving circuit for a stepping motor.

FIG. 1 is a circuit diagram showing a driving circuit for a stepping motor in the embodiment 1 according to the present invention. In FIG. 1 and FIGS. 3, 5 and 6, to be explained later, showing the embodiments according to the present invention, the parts which are common with those shown in FIG. 9 and FIG. 12 are given the same symbols and numerals and the explanation on them will be omitted.

Figure 12:
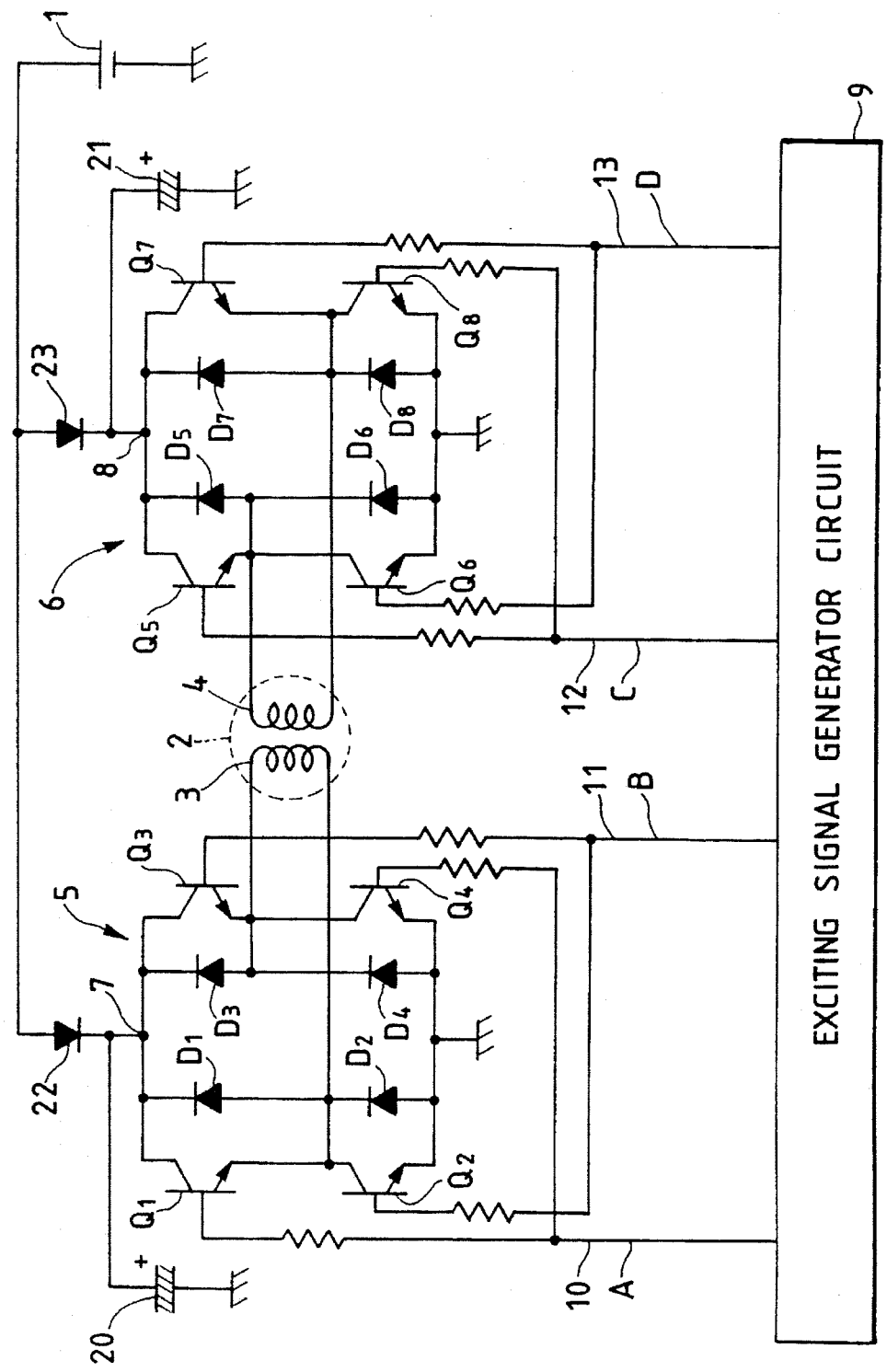
FIG. 12 is a circuit diagram showing another example of a conventional driving circuit for a stepping motor.

In the case of the circuit described in FIG. 1, the diodes, 22 and 23, in the circuit shown in FIG. 12 are replaced with constant voltage diodes (Zener diodes), 24 and 25, and connected between the DC power source 1 and the junction points, 7 and 8, of respective bridge circuits, 5 and 6. In the case of the constant voltage diodes, 24 and 25, a forward direction current can flow similar to the case of the rectifier diodes, 22 and 23, shown in FIG. 12, and when a reverse voltage higher than a predetermined value is applied they perform Zener breakdown and become conductive, and at that time the voltage between both terminals shows a constant value. In the embodiment 1, the sum of the voltage Vs of the DC power source 1 and the voltage Vr of the constant voltage diodes, 24 or 25, that is, Vs+Vr is set to be higher than the DC source voltage Vs and a little lower than the breakdown voltage of the switching elements, Q1 to Q8. Except the difference described in the above, the function in the circuit described in FIG. 1 is the same as that in the circuit shown in FIG. 12.

The basic driving system and the operation of a stepping motor 2 in the circuit shown in FIG. 1 are the same as those in the circuit shown in FIG. 12. Also in the circuit shown in FIG. 1, for example, at a time t1 as shown in FIG. 2, when an exciting signal is applied to the first and the fourth switching elements, Q1 and Q4, and the second and the third switching elements, Q2 and Q3, are made OFF, a current generated by the counter electromotive force induced in the first coil 3 flows in the capacitor 20 and the charged voltage Vc is increased. However, when the voltage Vc of the capacitor 20 approaches to the breakdown voltage of the switching elements, Q1 to Q4, the constant voltage diode 24 is turned conductive, and the voltage Vc of the capacitor 20 is clamped to the sum of the source voltage Vs and the voltage Vr of the constant voltage diode 24. Thereby, the destruction caused by breakdown of the second or the third switching elements, Q2 or Q3, can be prevented. The effect obtained by providing capacitors, 20 and 21, is the same as the effect obtained in the above-mentioned circuit shown in FIG. 12.
(Embodiment 2)

Figure 3:
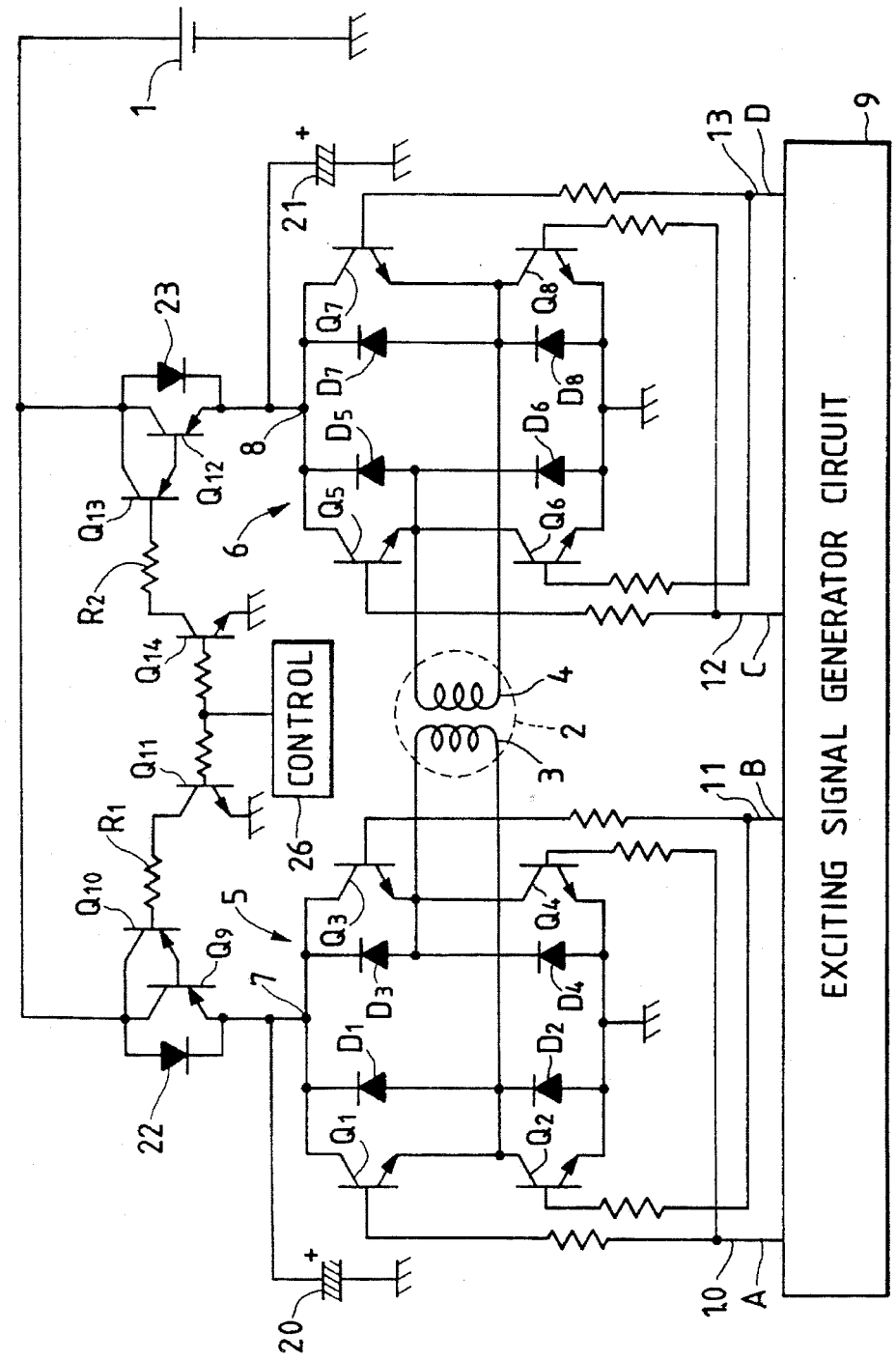
FIG. 3 is a circuit diagram showing a driving circuit for a stepping motor in a second embodiment according to the present invention.

FIG. 3 shows a driving circuit for a stepping motor in the embodiment 2 according to the present invention. In the present embodiment, transistors, Q9 to Q13, and resistors, R1 and R2, are added to the circuit shown in FIG. 12, and the rest of the circuit is constituted in the same way as that shown in FIG. 12. The transistors, Q9 and Q10, on the side of the first bridge circuit 5 are Darlington-connected and function as a first switching element for feedback. The emitter of the Darlington transistor is connected to the junction point 7 and the collector is connected to the DC power source 1. A transistor Q11 for ON/OFF control is connected between the base of the transistor Q10 and the ground through a resistor R1. The base of the transistor Q11 for control is connected to a control circuit 26. The transistors, Q12 and Q13, on the side of the second bridge circuit 6 are Darlington-connected and function as a second switching element for feedback. The emitter of the Darlington transistor is connected to the junction point 8 and collector is connected to the DC power source 1. A transistor Q14 for ON/OFF control is connected between the base of the transistor Q13 and the ground through a resistor R2. The base of the transistor Q14 for control is connected to a control circuit 26. The control circuit 26 generates an ON control signal when the rotational speed of the stepping motor 2 is lower than a predetermined value and generates an OFF signal when the rotational speed is higher than the predetermined value.

The basic operation of the circuit shown in FIG. 3 is the same as that of the circuit shown in FIG. 12. When the rotational speed of a stepping motor 2 shown in FIG. 4 is in a low rotational speed region lower than a predetermined value N1, transistors, Q9 and Q12, are ON controlled as shown in FIG. 4(A). In the result, the junction points, 7 and 8, of the first and the second bridge circuits, 5 and 6, are in a state where they are connected to the DC power source 1 through the transistors, Q9 and Q12, and the capacitors, 20 and 21, function in the same way as the DC power source 1. Therefore, when the rotational speed is less than N1, the circuit shown in FIG. 3 is operated in the same way as the circuit shown in FIG. 9 is operated. In the case of low rotational speed operation, the pullout torque τ is comparatively large as shown in FIG. 4(B), so that there is no need to obtain the increasing effect of the pullout torque τ by the capacitors, 20 and 21, as explained in the circuit shown in FIG. 12. The period of time in which a current flows based on the counter electromotive force induced in the first and the second coils, 3 and 4, is elongated, which makes it possible to control the overshoot and the vibration at the stop angle of the rotor 19. In a conventional circuit as shown in FIG. 12, even in a low rotational speed region, the capacitors, 20 and 21, function, so that the pullout torque τ is made extremely large and the supply current I from the DC power source 1 is also made large; however, in the circuit shown in FIG. 10 in the present embodiment, the voltage of the capacitors, 20 and 21, is held approximately equal to the source voltage; thereby, there is no fear of the incurrence of extreme increase in the pullout torque τ and the increase in the supply current from the power source.

In a high rotational speed region higher than N1, the transistors, Q9 and Q12, are made OFF. In the result, the circuit is operated in the same way as the circuit shown in FIG. 12, and the current based on the counter electromotive force induced in the first and the second coils, 3 and 4, can be absorbed by the capacitors, 20 and 21; thereby, the period of time in which a current based on the counter electromotive force flows can be made short, which makes it possible to operate a stepping motor in a high rotational speed and also to increase the pullout torque τ.

(Embodiment 3)

Figure 5:
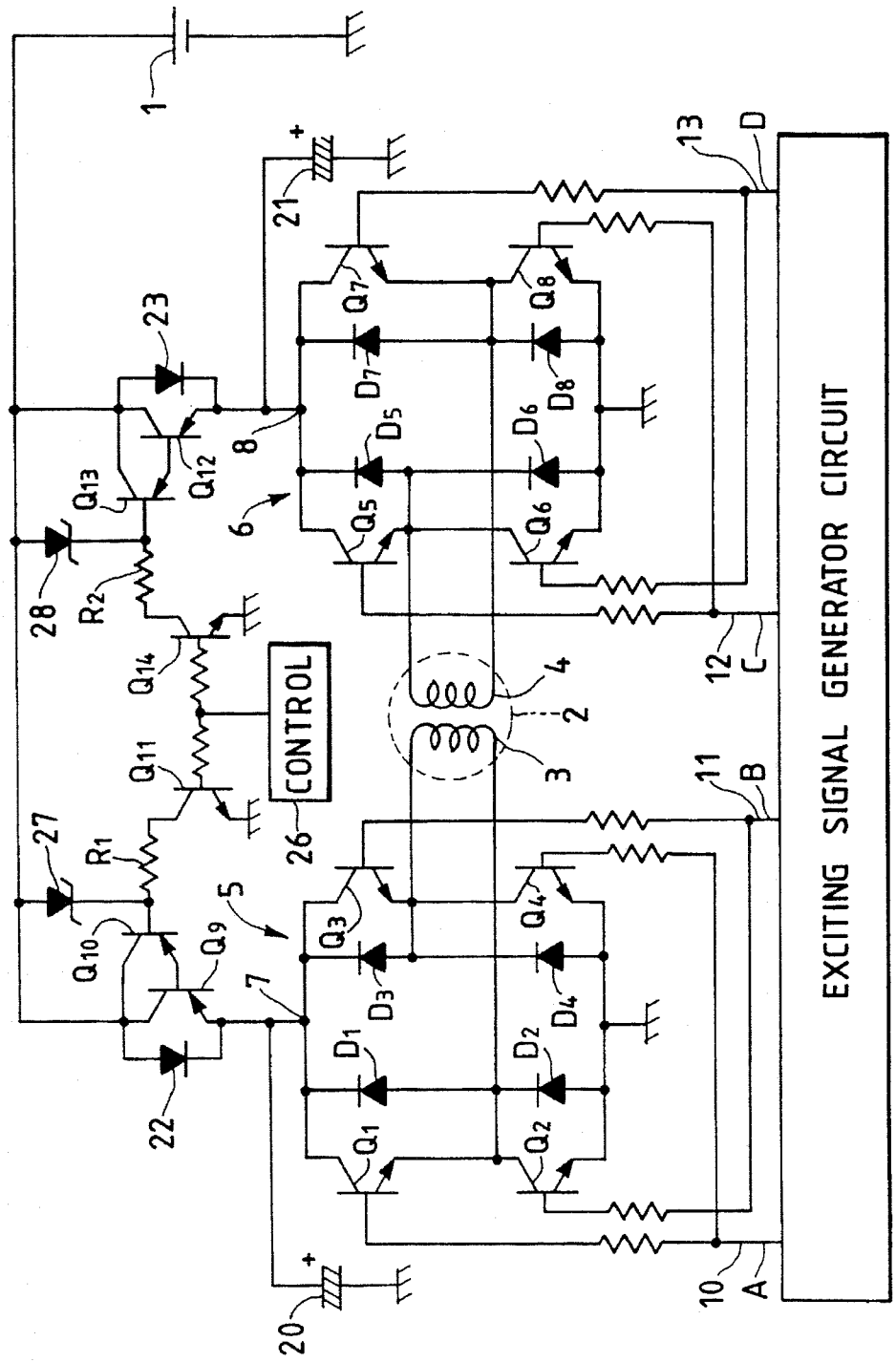
FIG. 5 is a circuit diagram showing a driving circuit for a stepping motor in a third embodiment according to the present invention.

In the case of a circuit shown in FIG. 5, constant voltage diodes, 27 and 28, are added to the circuit shown in FIG. 3. Each of these constant voltage diodes, 27 and 28, is connected between the base and the collector of the transistor Q10 or Q13. In the above-mentioned circuit, in a state where a stepping motor is operated in a high rotational speed region higher than N1 as shown in FIG. 4 and the transistors, Q9 and Q12, are in an OFF state, if the voltage Vc of the capacitors, 20 and 21, is raised close to the breakdown voltage of the switching elements, Q1 to Q8, the constant voltage diodes, 27 and 28, are turned conductive and feedback loops are formed with a circuit composed of the emitters and the bases of the transistors, Q9 and Q10, and the constant voltage diode 27 and a circuit composed of the emitters and the bases of the transistors, Q12 and Q13, and the constant voltage diode 28, and the voltage of the capacitors, 20 or 21, is controlled to be a constant value as shown in FIG. 2(C); thus, the switching elements, Q1 to Q8, are protected. In other words, the circuit in the present embodiment has both effects obtained in the circuits shown in FIG. 1 and FIG. 3.

(Embodiment 4)

Figure 6:
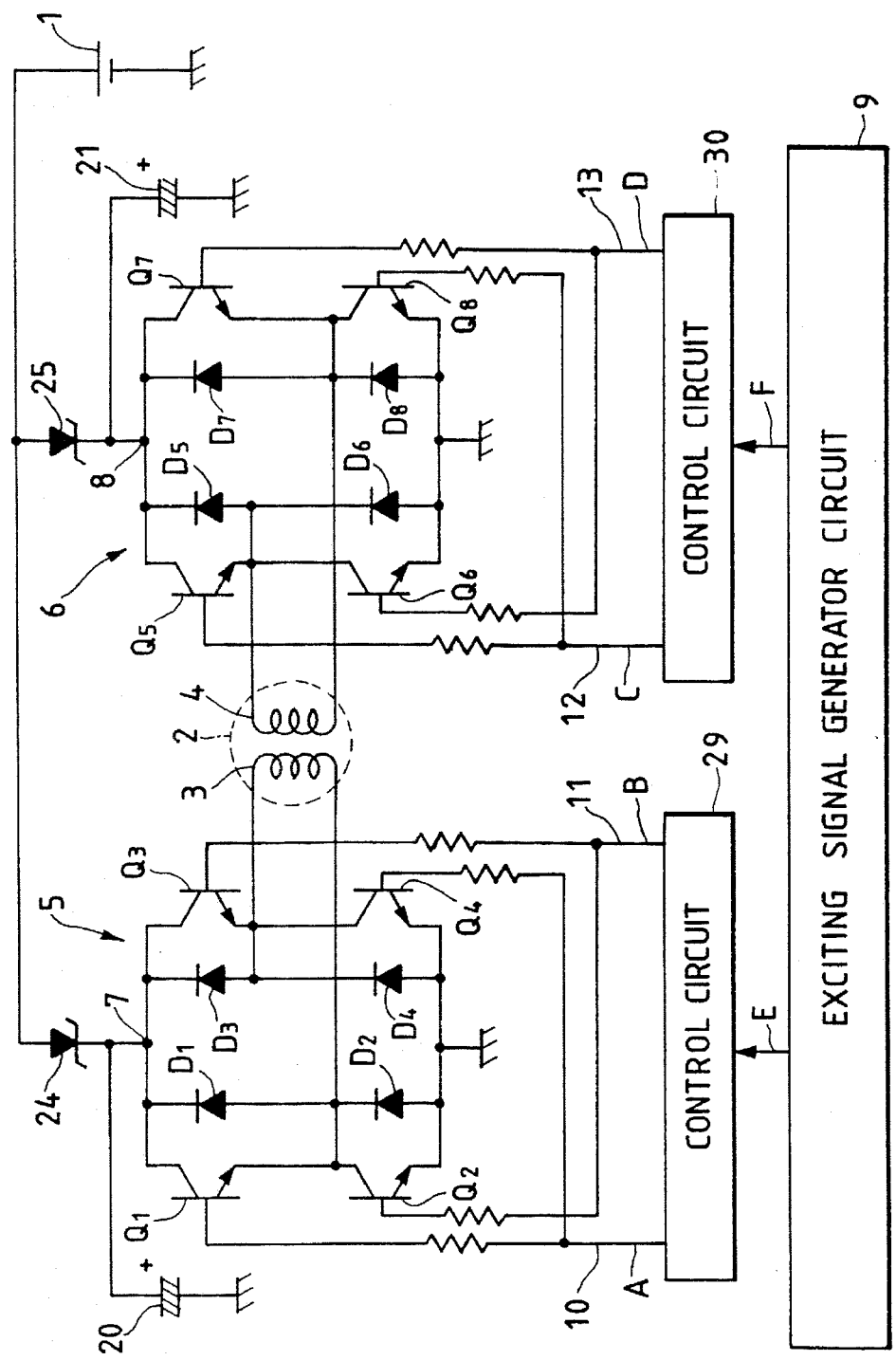
FIG. 6 is a circuit diagram showing a driving circuit for a stepping motor in a fourth embodiment according to the present invention.

FIG. 6 is concerned with the embodiment 4, and the switching elements, Q1 to Q8, are not continuously ON controlled in the ON period of them but the circuit is so constituted that the current control is performed intermittently and control circuits, 29 and 30, are provided. An exciting signal generator circuit 9 generates an exciting signal as shown in FIGS. 7(E) and 7(F). The waveform shown in FIGS. 7(E) and 7(F), are the same as that shown in FIGS. 11(A) and 11(C). The control circuit 29 forms PWM (pulse width modulation) pulses as shown in FIGS. 7(A) and 7(B), based on the exciting signal shown in FIG. 12(E) and transmits the pulses to the switching elements, Q1 to Q4. The control circuit 30 forms PWM (pulse width modulation) based on the exciting signal shown in FIG. 12(F) and transmits the pulses to the switching elements Q5 to Q8. The pulse width of the PWM pulses shown in FIGS. 7(A) to 7(D), is feedback-controlled to make the current which flows through the first or the second coil, 3 or 4, or the current which flows from the DC power source 1 detected by a current detector (not shown in a drawing) to have a constant value. The pulse widths of pulses in the beginning of the ON period (exciting period) are wider than the pulse widths at the end of the period.

The main circuit shown in FIG. 6 is the same as that shown in FIG. 1, so that the same effect can be obtained.

The modified examples as shown below will be cited based on the embodiments according to the present invention as described in the above.

(1) In the circuit shown in FIG. 3, it is possible to replace the diodes, 22 and 23, with the constant voltage diodes, 31 and 32, shown in FIG. 8. The same effect as that obtained in the circuit shown in FIG. 5 can be obtained in the modified circuit as described in the above.

(2) In the circuits shown in FIGS. 3, 5 and 8, it is possible to execute current control by PWM pulses in the same way as in the circuit shown in FIG. 6.

(3) It is possible to constitute diodes, D1 to D8, in a unity with switching elements Q1 to Q8.

(4) It is possible to replace switching elements, Q1 to Q8, with insulated gate type field effect transistors in which sources are connected to a substrate and use the built-in diodes in place of the diodes, D1 to D8.

(5) It is possible to drive a stepping motor with the other exciting system than the two-phase exciting system.

(6) It is possible to use transistors of different types from each other for the switching elements, Q1, Q3, Q5 and Q7 on the upper side in the figure and for the switching elements, Q2, Q4, Q6 and Q8 on the lower side.

What is claimed is:

1. A driving circuit for a stepping motor, the stepping motor including a plurality of coils, the driving circuit comprising:

a plurality of bridge circuits, each bridge circuit including:
  a junction point,
  switching elements connected between the junction point and one of the plurality of coils of the stepping motor, and
  rectifier diodes connected in antiparallel to said switching elements, a plurality of capacitors, each capacitor connected between the junction point of one of the plurality of bridge circuits and ground, a plurality of constant voltage diodes, each constant current diode connected between a DC power source and said junction point one of the plurality of bridge circuits, wherein said switching elements of said bridge circuit are ON/OFF controlled by a predetermined exciting system.

2. A driving circuit for a stepping motor according to claim 1, wherein each of the plurality of constant voltage diodes comprises a Zener diode having an anode connected to the DC power source and a cathode connected to the junction point of one of the plurality of bridge circuits such that currents flow from said DC power source to said one of said bridge circuits when the Zener diode is biased in the forward direction, and said Zener diode is conductive in a reverse direction when said one of said capacitors is charged up to a predetermined voltage, which is lower than the breakdown voltage of said switching elements, by the counter electromotive force induced in the coils even if the rectifier diodes are in a biased state in the reverse direction.

3. A driving circuit for a stepping motor, the stepping motor including a plurality of coils, the driving circuit comprising:

a plurality of bridge circuits, each bridge circuit including:
a junction point,
a first plurality of switching elements connected between the junction point and one of the plurality of coils of the stepping motor, and
a first plurality of rectifier diodes connected in antiparallel to said switching elements, a plurality of capacitors, each capacitor connected between the junction point of one of the plurality of bridge circuits and ground, a second plurality of rectifier diodes, each of the second rectifier diodes being connected between a DC power source and the junction point of one of said plurality of bridge circuits, a second plurality of switching elements, each of the second switching elements being connected in parallel to one of the second rectifier diodes between the DC power source and the junction point of one of the bridging circuits, and control circuits to ON/OFF control the second plurality of switching elements, wherein said first switching elements are ON/OFF controlled by a predetermined exciting system.

4. A driving circuit for a stepping motor according to claim 3, wherein the second plurality of rectifier diodes connected between said DC power source and the junction points of said bridge circuits have directivity such that currents flow to said circuits from said DC power source through said bridge circuits, and said second plurality of switching elements have directivity such that currents flow generated by the counter electromotive force induced in said coils.

5. A driving circuit for a stepping motor according to claim 4, wherein each of said second plurality of switching elements includes a transistor having an emitter connected to the junction point of one of said bridge circuits and a collector connected to said DC power source, and a constant voltage diode connected between the base and the collector of the transistor and are set to turn conductive when said capacitors are charged up to a predetermined voltage which is lower than the breakdown voltage of said switching elements by the counter electromotive force induced in said coils even if the diodes are in a biased state in the reverse direction.

6. A driving circuit for a stepping motor, the stepping motor including a plurality of coils, the driving circuit comprising:

a plurality of bridge circuits, each bridge circuit including:
a junction point,
a first plurality of switching elements connected between the junction point and one of the plurality of coils of the stepping motor, and
a plurality of rectifier diodes connected in antiparallel to said switching elements, a plurality of capacitors, each capacitor connected between the junction point of one of the plurality of bridge circuits and ground, a plurality of constant voltage diodes, each constant voltage diode being connected between said DC power source and the junction point of one of said bridge circuits, each constant voltage diode being conductive when said capacitors are charged by the counter electromotive force induced in said coils up to a predetermined voltage which is higher than the voltage of said DC power source and lower than a breakdown voltage of said first plurality of switching elements even if the rectifier diodes are in a biased state in the reverse direction, a second plurality of switching elements, each of the second switching elements being connected in parallel to one of the constant voltage diodes between the DC power source and the junction point of one of the bridging circuits, and control circuits to ON/OFF control the second plurality of switching elements, wherein said first switching elements are ON/OFF controlled by a predetermined exciting system.

* * * * *